(12) United States Patent
Suda et al.

(10) Patent No.: US 7,252,868 B2
(45) Date of Patent: Aug. 7, 2007

(54) REINFORCED FIBROUS INSULATION PRODUCT AND METHOD OF REINFORCING SAME

(75) Inventors: David I. Suda, Warrington, PA (US); Michael J. Lembo, Souderton, PA (US)

(73) Assignee: CertainTeed Corporation, Valley Forge, PA (US)

( * ) Notice: Subject to any disclaimer, the term of this patent is extended or adjusted under 35 U.S.C. 154(b) by 222 days.

(21) Appl. No.: 10/806,810

(22) Filed: Mar. 23, 2004

(65) Prior Publication Data

US 2005/0153616 A1 Jul. 14, 2005

Related U.S. Application Data

(63) Continuation-in-part of application No. 10/753,741, filed on Jan. 8, 2004, and a continuation-in-part of application No. 10/753,603, filed on Jan. 8, 2004.

(51) Int. Cl.
*B32B 5/26* (2006.01)
*B32B 17/02* (2006.01)
*B32B 17/12* (2006.01)
*B32B 31/08* (2006.01)

(52) U.S. Cl. .................. 428/74; 428/76; 442/327; 442/331; 442/332; 442/348; 156/247; 156/344

(58) Field of Classification Search .................. None
See application file for complete search history.

(56) References Cited

U.S. PATENT DOCUMENTS

| | | | |
|---|---|---|---|
| 1,238,356 A | 8/1917 | Stokes | |
| 2,341,130 A | 2/1944 | Unsworth | |
| 2,543,101 A | 2/1951 | Francis, Jr. | |
| 2,785,728 A | 3/1957 | Slayter et al. | |
| 3,642,554 A | 2/1972 | Hensley | |
| 3,812,002 A | 5/1974 | Lurie | |
| 3,850,723 A * | 11/1974 | Ackley | 156/180 |
| 3,910,145 A | 10/1975 | Bender et al. | |
| 3,955,031 A | 5/1976 | Jones et al. | |
| 3,958,385 A | 5/1976 | Bondra et al. | |

(Continued)

FOREIGN PATENT DOCUMENTS

DE 78 30 852 1/1979

(Continued)

OTHER PUBLICATIONS

Miller, B., "Critical Evaluation of Upward Wicking Tests", International Nonwovens Journal, www/inda/subscrip/inj00_1/p35.html, pp. 1-3, Mar. 12, 2002.

(Continued)

*Primary Examiner*—Sam Chuan Yao
(74) *Attorney, Agent, or Firm*—Duane Morris LLP

(57) ABSTRACT

An insulation product, and method of making the same, is provided comprising a mat containing randomly oriented fibers bonded by a binder, the mat having first and second major surfaces and a pair of side portions, and at least one flexible reinforcing layer bonded to the mat between the first and second major surfaces and extending along a length of said mat.

20 Claims, 8 Drawing Sheets

U.S. PATENT DOCUMENTS

| | | | |
|---|---|---|---|
| 3,964,232 A | | 6/1976 | Bender et al. |
| 3,979,537 A | | 9/1976 | Troyer |
| 4,098,943 A | * | 7/1978 | Degginger et al. ....... 428/300.7 |
| 4,101,700 A | | 7/1978 | Ray, Jr. et al. |
| 4,201,247 A | * | 5/1980 | Shannon .................... 138/141 |
| 4,263,007 A | | 4/1981 | Battigelli et al. |
| 4,273,685 A | * | 6/1981 | Marzocchi et al. ......... 523/150 |
| 4,282,687 A | | 8/1981 | Teleskivi |
| 4,310,585 A | | 1/1982 | Shannon |
| 4,316,865 A | | 2/1982 | Battigelli et al. |
| 4,342,610 A | | 8/1982 | Ray, Jr. |
| 4,397,898 A | | 8/1983 | Ray, Jr. |
| 4,661,392 A | | 4/1987 | Kapstad |
| 4,709,523 A | | 12/1987 | Broderick et al. |
| 4,726,985 A | | 2/1988 | Fay et al. |
| 4,756,945 A | | 7/1988 | Gibb |
| 4,835,045 A | | 5/1989 | Kielmeyer et al. |
| 4,847,140 A | | 7/1989 | Jaskowski |
| 4,866,905 A | | 9/1989 | Bihy et al. |
| 4,917,750 A | * | 4/1990 | Klose .......................... 156/254 |
| 4,917,929 A | | 4/1990 | Heinecke |
| 4,972,644 A | | 11/1990 | Rumiesz, Jr. et al. |
| 5,009,043 A | | 4/1991 | Kurrasch |
| 5,031,721 A | | 7/1991 | Barden et al. |
| 5,065,478 A | | 11/1991 | Furtak et al. |
| 5,169,700 A | * | 12/1992 | Meier et al. ................... 428/74 |
| 5,246,653 A | | 9/1993 | Horres |
| 5,246,760 A | | 9/1993 | Krickl |
| 5,302,332 A | | 4/1994 | Simola et al. |
| 5,331,787 A | | 7/1994 | Paulitschke et al. |
| 5,350,063 A | | 9/1994 | Berdan et al. |
| 5,545,279 A | | 8/1996 | Hall et al. |
| 5,545,453 A | | 8/1996 | Grant et al. |
| 5,567,504 A | | 10/1996 | Schakel et al. |
| 5,578,258 A | | 11/1996 | Grant et al. |
| 5,620,497 A | | 4/1997 | Aschenbeck et al. |
| 5,642,601 A | | 7/1997 | Thompson, Jr. et al. |
| 5,685,938 A | | 11/1997 | Knapp et al. |
| 5,765,318 A | | 6/1998 | Michelsen |
| 5,783,268 A | | 7/1998 | Noonan et al. |
| 5,817,387 A | | 10/1998 | Allwein et al. |
| 5,848,509 A | * | 12/1998 | Knapp et al. ............... 52/406.2 |
| 5,900,206 A | * | 5/1999 | Pellegrin et al. ............ 264/555 |
| 5,965,851 A | * | 10/1999 | Herreman et al. .......... 181/200 |
| 6,000,437 A | | 12/1999 | Ponder |
| 6,083,594 A | | 7/2000 | Weinstein et al. |
| 6,083,603 A | | 7/2000 | Patel et al. |
| 6,141,930 A | | 11/2000 | Allwein et al. |
| 6,165,305 A | | 12/2000 | Weinstein et al. |
| 6,231,927 B1 | | 5/2001 | Ruid |
| 6,270,865 B1 | | 8/2001 | Noonan et al. |
| 6,357,504 B1 | | 3/2002 | Patel et al. |
| 6,383,594 B2 | | 5/2002 | Weinstein et al. |
| 6,415,573 B1 | | 7/2002 | Moulder |
| 6,422,848 B1 | | 7/2002 | Allen et al. |
| 6,468,615 B2 | | 10/2002 | Weinstein et al. |
| 6,484,463 B1 | | 11/2002 | Fay et al. |
| 6,551,677 B2 | | 4/2003 | Weinstein et al. |
| 6,551,951 B1 | | 4/2003 | Fay et al. |
| 6,599,850 B1 | | 7/2003 | Heifetz |
| 6,670,011 B2 | | 12/2003 | Weinstein et al. |
| 2001/0030018 A1 | | 10/2001 | Weinstein et al. |
| 2002/0015814 A1 | | 2/2002 | Weinstein et al. |
| 2002/0040556 A1 | | 4/2002 | Weinstein et al. |
| 2002/0136854 A1 | | 9/2002 | Smith et al. |
| 2003/0082369 A1 | | 5/2003 | Arndt et al. |
| 2003/0082387 A1 | | 5/2003 | Arndt et al. |
| 2003/0144639 A1 | | 7/2003 | Gehling et al. |
| 2003/0175466 A1 | | 9/2003 | Bogrett et al. |

FOREIGN PATENT DOCUMENTS

| | | |
|---|---|---|
| DE | 79 20 480 | 11/1979 |
| DE | 3229601 A1 | 3/1984 |
| DE | 4108110 A1 | 12/1991 |
| DE | 93 02 056.2 | 8/1993 |
| DE | 197 00 373 A1 | 2/1998 |
| DE | 3118597 A1 | 2/1998 |
| DE | 4435317 A1 | 4/1998 |
| EP | 101376 B1 | 2/1984 |
| EP | 0565392 B2 | 10/1993 |
| EP | 0732464 A1 | 9/1996 |
| GB | 1358345 | 7/1974 |
| WO | WO 94/29540 A1 | 12/1994 |
| WO | WO 98/42930 | 10/1998 |
| WO | WO 01/63063 A1 | 8/2001 |

OTHER PUBLICATIONS

Kim, H.S. et al., "Characterizing Fuzz in Nonwoven Fabrics", International Nonwovens Journal, www/inda/subscrip/inj00_1/p18.html, pp. 1-8, Mar. 11, 2002.

Dent, R.W., "An Analysis of Fabric 'Hand' and 'Feel'", International Nonwovens Journal, www/inda/subscrip/inj00_1/p11.html, pp. 1-11, Mar. 12, 2002.

Oathout, J.M., "Determining the dynamic efficiency with which wiping materials remove liquids from surfaces", International Nonwovens Journal, www/inda/subscrip/inj00_1/p30.html, pp. 1-9, Mar. 11, 2002.

Barker, R.L., "Evaluating operating room gowns: comparing comfort of nonwoven and woven materials", International Nonwovens Journal, www/inda/subscrip/inj00_1/p230.html, pp. 1-10, Mar. 12, 2002.

International Nonwovens Journal, vol. 9, No. 1, 40 pages, Spring 2000, www.inda.org/subscrip/.

Huang and Gao, "Spunbond Technology", http://216.239.39.104/search?q=cache:0eatiNLJVeEJ:www.apparelsearch.com/education_r, pp. 1-13, Jul. 29, 2003.

Garland Insulation, New Home Construction, http://216.239.57.104/search?q=cache:qnVm9UlfP7cJ:www.garlandinsulating.com/newho , pp. 1-5, Aug. 1, 2003.

Mercantile Development, Inc. Web Bonding Techniques, http://www.diwipers.com/Technolocy/webbondingtechniques.htm , pp. 1-5, Jul. 29, 2003.

TRENDS, Index '99, "Nordson debuts new look, new products at INDEX '99", pp. 1-4, vol. 11, No. 1, Apr. 1999.

Series MB-200 Meltblown Applicator, Nordson, trade literature pp. 1-2, 2000.

Nordson, Operator's Card, Meltblown (MB200) Applicators, pp. 1-6, undated, no date available.

Nordson Melt Blown Fiberization for Insulation Batt Coating, report, 2 pages, undated, no date available.

Nordson, Center of Excellence Nonwovens Pilot Line, COE II Specifications, 4 pages, 2002.

Nordson, Non-Contact Wide-Web Laminating, 2 pages, 1999.

Nordson, EP 26 SD / EP 34 S/ EP 34 SD Hot Melt Spray Guns, 2 pages, 2002.

Nordson, Series CF-200 Controlled Fiberization™ Guns, 2 pages, 1996.

Nordson, Controlled Fiberization™ Spray Nozzles, 2 pages, 1995.

Nordson, Series 3800V and 3900V Applicators with Vista™ Controls, 2 pages, 1998.

Nordson, PA-2520 Adhesive Applicator for Product Assembly, 2 pages, 1998.

Nordson, PA-2510 Adhesive Application System, 2 pages, 1998.

Nordson, Series 3000V Applicators with Vista™ Controls, 2 pages, 1996.

Nordson, Series CC-200 Modular Control Coat® Applicator, 2 pages, 1998.

Nordson, Series MB-200 Meltblown Applicator, 2 pages, 2000.

Nordson Corporation Nonwovens Systems, Atlanta Equipment and Web Handling Capability, 1 page, 2003.

Nordson Corporation Nonwovens Systems, The Control Coat® System, http://www.nordson.com/nonwovens/ctricoat.htm, pp. 1-3, accessed Feb. 16, 2003.
Nordson Corporation Nonwovens Systems, Nozzles, http://www.nordson.com/nonwovens/nozzles.htm, pp. 1-2, accessed Feb. 16, 2003.
Nordson, MX 3400 and 4400 Series Adhesive Application System brochure, 4 pages, 2001.
Rockwool Silk, Rockwool A/S, 2 pages, Oct. 31, 2003.
Gullifiber Insulation with Gillfiber, Do-it-yourself, Dec. 1983.
Gullfiber M-Skiva, Mar. 1984 (Product Literature).
Johns Manville, Easyfit, 2002 (Product Literature).
Johns Manville, Formaldehyde-free, 2002 (Product Literature).
International Search Report for PCT/US05/09144 dated Nov. 10, 2005.
British Gypsum-Isover, Isowool Comfort, Glass Mineral Wool Insulation Encapsulated in a Super-Soft Fabric Providing Therman and Acoustic Insulation in Roofs and Ceilings, Product Information, 2 pages, no date available.
CertainTeed Corporation, "Specification Sheet ToughGard™ Duct Liner with Enhanced Surface", 2001.
CertainTeed Corporation, "Certa*Faced Ultra*Duct Marketing Plan", Nov. 22, 1993.
CertainTeed Corporation, "List Prices—ToughGard Duct Board", Oct. 1, 1994, Valley Forge, Pennsylvania, USA.
CertainTeed Corporation, "Product Sheet—ToughGard Duct Board Fiber Glass Duct Board Systems", 1994, Valley Forge, Pennyslvania, US.
CertainTeed Corporation, "Product Specification: PS 57.00", May 23, 1994.
CertainTeed Corporation, "Raw Material Specification: Certa*Faced Ultra*Duct Mat Facing", Jun. 23, 1994.
CertainTeed Corporation, "Specification Sheet—ToughGard Duct Board with Enhanced Surface", Jan. 2002.
CertainTeed Corporation, "Specification Sheet—ToughGard Duct Board with Enhanced Surface", May 2001.
CertainTeed Corporation, "Specification Sheet—Ultra*Duct Gold", Mar. 2002.
CertainTeed Corporation, CertainTeed Building Solutions, "Product Information," CertainTeed Duct Insulation, no date available.
CertainTeed Spec. Sheet, ToughGard™ Duct Board, 2 pages, Apr. 2001.
CETIAT "Test Report" Jul. 24, 1991, 3 pages (translation attached).
Climaver 234 (1982).
Climaver 254 (1984).
Climaver 264 (1982).
Climaver 284-234 "Construction and self-support air conditioning ducts", 4 pages (translation attached) (1988).
Climaver Plata, Specification of a Product, Relevance on first page, density 70 kg/m (no translated) (1992).
Elasti-Glass® R3100B Series Glass Fiber Mats, Schuller, 2 pages (May 1997).
France -Air, "Glass Fibre panels for air ducts" (translation attached), 21 pages (1992).
French Republic, National Testing Laboratory, Nov. 28, 1998, 1 page (translation attached).
Glass Fiber Manufacturing, Mineral Products Industry Sep. 1985 (reformatted Jan. 1995), pp. 11.13-11.13-6.
Glasuld "Product Data-Industrial Sheet Black" Sheet: 172 page 1, Nov. 1989, 1 page (translation of parts of the Danish ventilation duct product "Iindustriplade Sort" attached).
Glasuld Ventilations-Kanaler (translation of parts of the Danish Duct Application brochure attached), no date available.
Isover "Gama Climaver", no date available.
Isover Gullfiber—translation of the relevant parts of the Swedish Product Catalogue for Technical Insulation Mar. 1989.

Isover Saint-Gobain Roche & Verre-Insulation and Air Conditioning, Mar. 1990, 3 pages (translation attached).
Johns Manville, Glass Fiber Mats, Elasti-Glass® 3200B Series, 1 p., Oct. 30, 2002.
Johns-Manville, "Type PM 10/3 Microlith® —Glass Fiber Nonwoven", Nov. 2003.
Johns-Manville, "Type PM 10/4 Microlith® —Glass Fiber Nonwoven", Dec. 2003.
Johns-Manville, "Air Handling Systems—Linacoustic RC™ Fiber Glass Duct Liner with Reinforced Coating System," (preliminary product information), AHS-329 Feb. 2002.
Johns-Manville, Air Handling Systems—SuperDuct™ Coated High Performance Air Duct Board, Type 475 & 800, AHS 200 Jun. 2000.
Knauf Air Duct Board, Form No. AH-SS-2 Effective: Jan. 1998, 2 pages.
Knauf Fiber Glass GmbH, "Submittal Sheet—Air Duct Board-M with Hydroshield Technology", Oct. 2000, USA.
Knauf Fiber Glass Insulation—Products 7 pages, Feb. 2002.
Knauf Fiber Glass Insulation—Products, Knauf Air Duct Board-M www.Knauffiberglass.com/index.cfm?fuseaction=prd.dspProdDetail&ID=14, pp. 1-6, © 2003.
Lydall, 23# Manniglas® 1803 WHB, Developmental Lot F2956, Data Sheet, 1 page, Nov. 20, 2002.
Lydall, 27# Manniglas® 1807, Developmental Grade Lab Handsheets, Data Sheet, 1 page, Jan. 8, 2004.
Lydall, 40# Manniglas® 1786 BX Black, Developmental Lot F2933, Data Sheet, 1 page, Nov. 20, 2002.
Lydall, 40# Manniglas® 1886 Black, Data Sheet, 1 page. Aug. 20, 2002.
Lydall, 40# Manniglas® 1886 Black, Product Specification, 1 page, Apr. 24, 2003.
North American Insulation Manufacturers Association, "Fibrous Glass Commercial Insulation Boards", Insulation Facts #67 , www.naima.org, Jan. 2003.
North American Insulation Manufacturers Association, "Fibrous Glass Duct Wrap", Insulation Facts #66, www.naima.org, Jan. 2003.
North American Insulation Manufacturers Association, "Fibrous Glass Duct Construction Standards", 2nd Edition, 1993.
Saint-Gobain Insulation, Facing of "Comfort Products," (mainly extracted from purchasers' working group with Nathalie Rose (CRIR) in 2001), T Gasser- CRIR, Oct. 25, 2002, 11 pages.
Saint-Gobain Isover Oy, Isover Comfort KL-C, product information, http://www.isover.fi/en/products/default.asp?aid=1&bid=4&cid=282&val=1, 3 pages.
Testing Data from the Competitive Audit on Mar. 25, 1999, 3 pages.
Underwriters Laboratories Inc., "Investigation of 'Climaver 284' Air Duct Board", Dec. 19, 1991, Northbrook, Illinois, USA.
Underwriters Laboratories Inc., "Report on Air Ducts", Jun. 8, 1992, Northbrook, Illinois, USA.
Certainteed CrimpWrap Crimped Pipe and Tank Wrap Specification Sheet, Dec. 2002, 2 pages.
Flex-Clad 400™, Data Sheet, MFM Building Products Corp., Coshocton, OH, 1 page, no date available.
Flex-Clad 400™, www.flexclad.com, web site home page, MFM Building Products Corp., Coshocton, OH, accessed Jul. 24, 2004, 2 pages.
VentureClad™ 1577CW®, Venture Tape Corp., Rockland, MA, product literature, 1 page, no date available.
LAMTEC Product Specifications for R-3070 Foil/Scrim/Kraft, www.lamtec.com/PS-R3070.htm, last updated May 11, 2004. Lamtec Corporation, 3 pages.

* cited by examiner

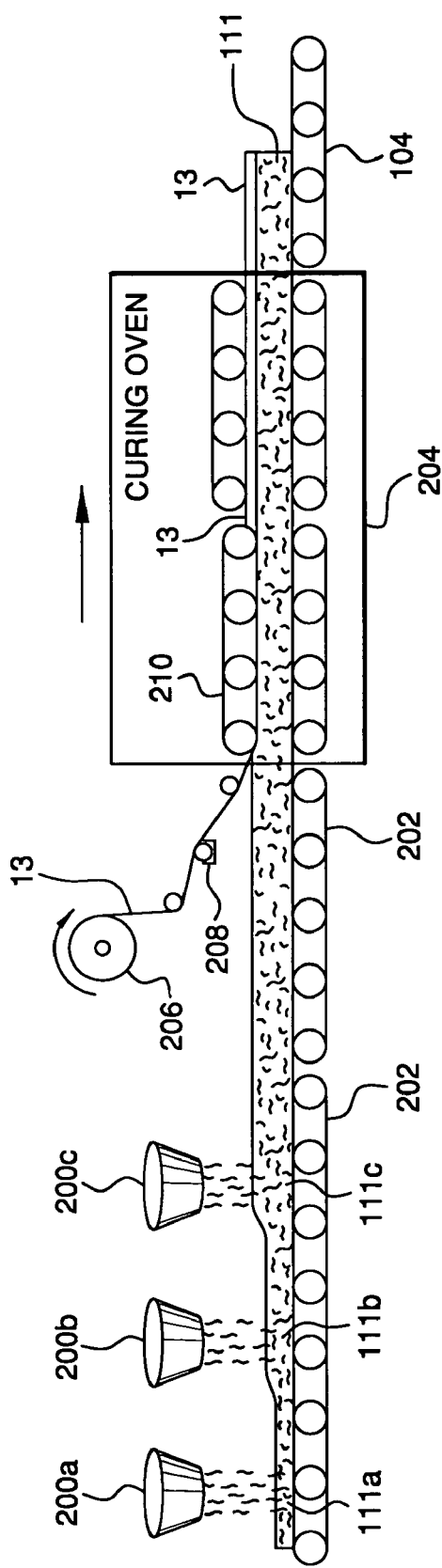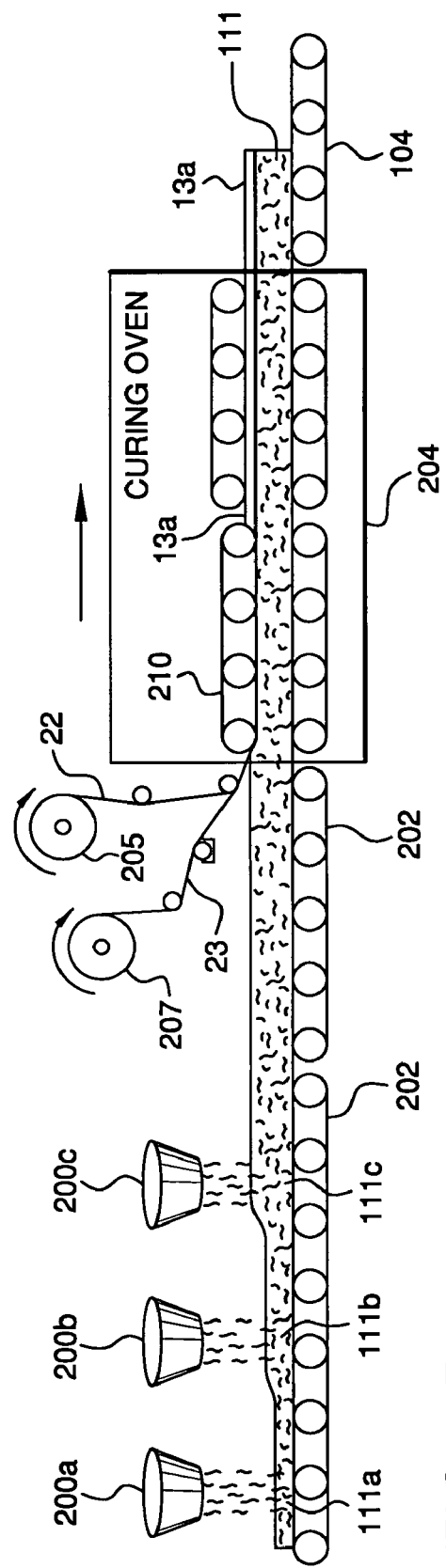

REINFORCED FIBROUS INSULATION PRODUCT AND METHOD OF REINFORCING SAME

CROSS-REFERENCE TO RELATED APPLICATION

This is a continuation-in-part of copending U.S. patent application Ser. No. 10/753,741 entitled "Insulation Product Having Nonwoven Facing" and U.S. patent application Ser. No. 10/753,603 entitled "Method of Making Insulation Product Having Nonwoven Facing" both of which were filed on Jan. 8, 2004, the entirety of which are hereby incorporated by reference herein.

FIELD OF INVENTION

The present invention relates to inorganic fiber insulation products having one or more facings thereon, and more particularly, to low density inorganic fiber insulation mats or batts having a nonwoven facing adhered to at least one major surface thereof.

BACKGROUND OF THE INVENTION

Batt insulation is commonly manufactured by fiberizing mineral fibers from a molten mineral bath by forcing them through a spinner rotating at a high number of revolutions per minute. The fine fibers are then contacted by a pressurized hot gas to draw the fibers to a useable diameter and length. The fibers are typically sprayed with a phenolic resin binder. The fibers are then collected and distributed on a conveyor to form a mat. The resin is then cured in a curing oven. The mat is then sliced into lengthwise strips having desired widths and chopped into individual batts. In some cases, a facing material, such as Kraft paper coated with a bituminous material or other vapor retarder, is added to the mat prior to the cutting step.

One of the known problems associated with installing glass fiber insulation materials is that they generate glass particle dust, which can be a cause of irritation to workers by contact with skin and eyes or by respiration. One way to reduce glass dust is to encapsulate insulation batts with a facing that reduces dust, but which is porous, and vapor permeable. WO94/29540, assigned to Owens Corning Fiberglas Corporation, teaches a polymeric facing which is adhered to one or both major surfaces of the batt with a fastening means, such as a small amount of adhesive material. The adhesive material is of a sufficiently small amount so as to enable the insulation batt not to exceed a flame spread rating of 25 using the ASTM E-84 flame spread test. The adhesive should be applied in sufficient quantity to bond the facing to the mineral fiber batt and enable the batt to be picked up and handled by the facing. The facings described in this reference are suggested to be a polypropylene or polyethylene material, which is adhered, stuck or heat sealed to the major surfaces of the batt.

Knapp et al., U.S. Pat. No. 5,848,509 commonly assigned with the instant application, teaches encapsulated glass fiber insulation within a nonwoven covering material. The nonwoven covering is disposed over the top surface of a mineral fiber core and extends adjacent the side surfaces. The covering is preferably formed from a web of nonwoven material, such as polyester, polypropylene, polyethylene or rayon, and is preferably applied to the top and sides of the glass fiber mat with a hot melt or suitable adhesive.

In order to provide insulation mats with encapsulated nonwoven coverings or films, quantities of adhesive must also be stored for adhering these coverings to batt insulation. Many adhesives and glues have a limited shelf life. Additionally, spraying these adhesives on batt surfaces requires constant cleanup and maintenance of manufacturing equipment and the work area. Still further, prior art encapsulated mats that utilize synthetic nonwoven facing layers such as polyester have proved difficult to cut in the field.

Accordingly, there remains a need for an encapsulated or faced insulation material which can be made less expensively, but which still reduces dust and permits air evacuation when the insulation product is compressed for packaging and which provides for improved ease of installation.

SUMMARY OF THE INVENTION

An insulation product, and method of making the same, is provided comprising a mat containing randomly oriented fibers bonded by a binder, the mat having first and second major surfaces and a pair of side portions, and at least one flexible reinforcing layer bonded to the mat between the first and second major surfaces and extending along a length of said mat. In one embodiment of the insulation product, a mat containing randomly oriented inorganic fibers bonded by a heat cured binder is provided. The mat comprises a plurality of stacked insulation layers, at least one nonwoven facing comprising randomly oriented glass fibers adhered to at least one of the first and second major surfaces, and at least one nonwoven sheet comprising randomly oriented glass fibers disposed between the plurality of stacked insulation layers and extending along a length of the mat.

The reinforcing layer provides added rigidity to the insulation product, thereby facilitating cutting thereof, without increasing binder content (at least significantly) within the insulation layers. Alternatively, the reinforcing layer can serve as a nonwoven facing layer after separation of an insulation layer at the reinforcing layer from a stack of insulation layers. The manufacturing method is easily adapted to provide reinforced insulation products having desired R-values and thicknesses. The reinforcing layer may also improve the stiffness, tensile strength and rigidity of the finished product, thereby facilitating the installation process and possibly reducing or eliminating the need to use staples or hangers for support. Further, the manufacturing method is easily adapted to provide insulation products that can be separated into one or more sub-products having any combination of number of insulation layers, insulation layer thicknesses and R-values by employing different combinations of insulation layers in the stack and different combinations of reinforcing layers.

BRIEF DESCRIPTION OF THE DRAWINGS

The accompanying drawings illustrate preferred embodiments of the invention, as well as other information pertinent to the disclosure, in which:

FIG. 3A is schematic side elevation view of a process for producing the insulation product of FIG. 1;

FIG. 3B is a schematic side elevation view of a process for producing the insulation product of FIG. 2;

DETAILED DESCRIPTION OF THE INVENTION

Provided herein are methods for making low density insulation products and the low density insulation products made thereby. Insulation materials generally span the range from light weight, flexible and resiliently compressible foams and nonwoven fiber webs to rigid or semi-rigid boards. Generally, these insulating materials have densities in the range of about 0.5-7 $lb/ft^3$ (8-112 $kg/m^3$). Foam and nonwoven fiber web materials are usually provided in continuous sheeting that is sometimes cut to preselected lengths, thus forming batts. These articles usually are "low density," in the range of about 0.5-6 $lb/ft^3$ (8-96 $kg/m^3$), and preferably about 1-4 $lb/ft^3$ (16-64 $kg/m^3$), and more preferably 0.3 to 1.5 $lb/ft^3$ (4.8-24 $kg/m^3$). The thickness of the insulation blanket or mat is generally proportional to the insulated effectiveness or "R-value" of the insulation. These low density insulation mats typically have a thickness between about 3.5-10 inches.

In contrast, rigid to semi-rigid insulation boards ("high density" insulation) tend to have densities in the higher portion of the range, at about 2-7 $lb/ft^3$ (32-112 $kg/m^3$), and preferably at about 4-7 $lb/ft^3$ (64-112 $kg/m^3$). These boards customarily are produced as sheets typically in the range of 0.25-2 inches in thickness and about 2-4 feet wide by about 4-12 feet long.

Figure 1:
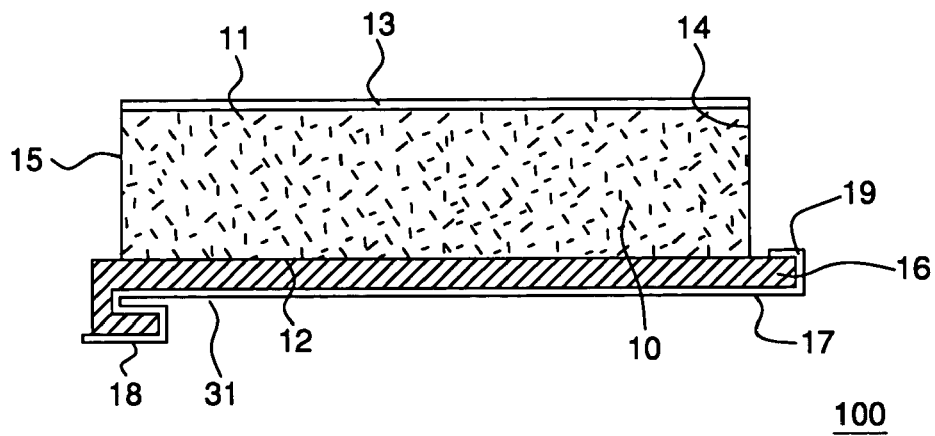
FIG. 1 is a side elevation view of an insulation product of this invention.
Figure 2:
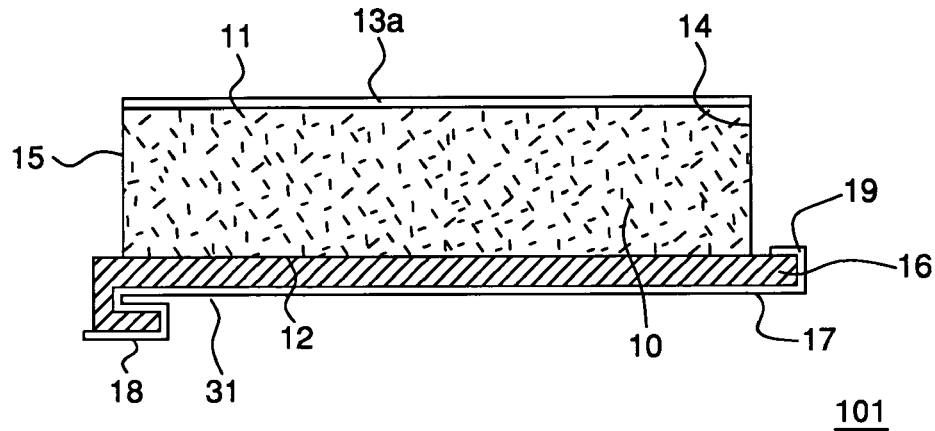
FIG. 2 is a side elevation view of an insulation product alternative of this invention.

With reference to the Figures, and more particularly to FIGS. 1-2 thereof, there are shown two insulation products 100 and 101. Insulation products 100 and 101 include a low density insulation blanket or mat 10 (as described above) formed from organic fibers such as polymeric fibers or inorganic fibers such as rotary glass fibers, textile glass fibers, stonewool (also known as rockwool) or a combination thereof. Mineral fibers, such as glass, are preferred. In some embodiments, a vapor retarder facing layer 17, which may be a cellulosic paper, typically formed from Kraft paper, coated with a bituminous adhesive material, such as asphalt, or polymeric film, such as LDPE (low density polyethylene), is provided on one major surface 12 of the insulation blanket or mat 10. The facing layer 17 and bituminous layer 16 together form bitumen-coated Kraft paper 31. The coating is preferably applied in a sufficient amount so as to provide an effective barrier or retarder for water vapor, for example, so as to reduce the water vapor permeability of the preferred Kraft paper to no more than about one perm when tested by ASTM E96 Method A test procedure. In other forms, where a vapor retarder or barrier is not desired, the insulation blanket or mat 10 can have no facing on its second major surface 12. Optionally, the facing layer 17 can be secured to the bottom of major surface 12 of the insulation blanket or mat 10 by an adhesive, such as a hot-melt adhesive.

In batt insulation 100 and 101, a pair of side tabs 18 and 19 are provided which can be unfolded and fastened to wooden or metal studs, for example. Various known configurations for side tabs or flaps 18 and 19 are known. Alternatively, there can be no tabs on the Kraft facing. The facing layer 17 can be water vapor impermeable or permeable, depending on its makeup, degree of perforation, and intended use.

The insulation blanket or mat 10 is typically formed from glass fibers, often bound together with a heat cured binder, such as known resinous phenolic materials, like phenolformaldehyde resins or phenol urea formaldehyde (PUFA). Melamine formaldehyde, acrylic, polyester, urethane and furan binder may also be utilized in some embodiments. The insulation is typically compressed after manufacture and packaged, so as to minimize the volume of the product during storage and shipping and to make handling and installation of the insulation product easier. After the packaging is removed, the batt insulation products 100 or 101 tend to quickly "fluff up" to their prescribed label thickness for insulation.

Figure 4:
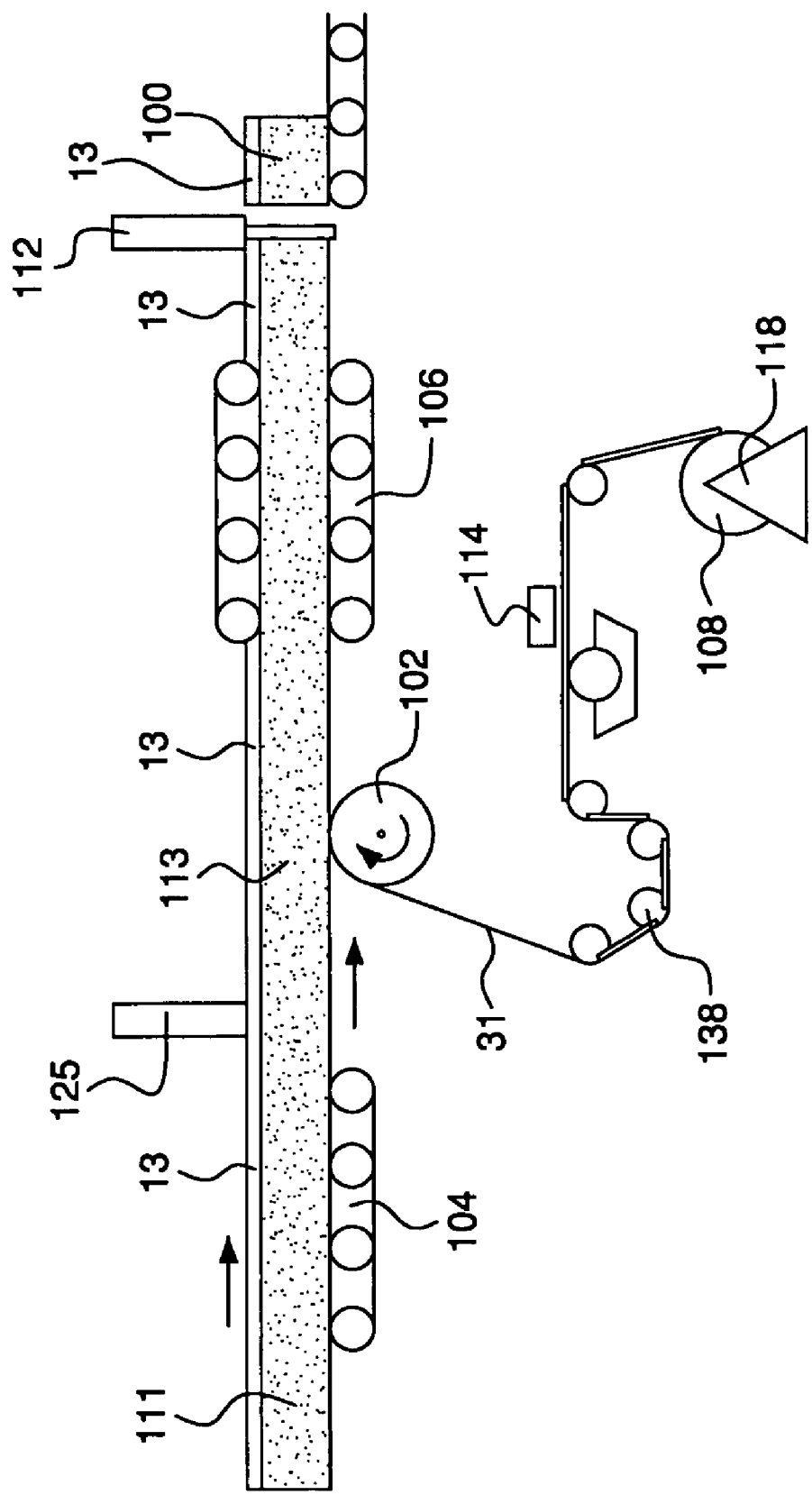
FIG. 4 is a schematic side elevation view of a process for providing a vapor retardant barrier to an insulation product.

While in an un-encapsulated insulation product, exposed surfaces can make installation troublesome, and often release unbound fibers and dust into the working environment, the present invention employs a nonwoven layer 13 that protects at least the first major surface 11 of the insulation blanket or mat 10. Alternatively, the nonwoven layer can coat one or both side surfaces 14 and 15, and even part or all of the second major surface 12, to dramatically reduce the release of unbound fibers and dust. In further embodiments, the nonwoven layer 13 can be applied to the cut end surfaces, after the chopper 112 step (FIG. 4).

The nonwoven layer 13 of this invention is preferably formed from a sheet of nonwoven material comprising randomly oriented organic or inorganic fibers, and in a preferred embodiment, randomly oriented glass fibers. In an exemplary embodiment, nonwoven layer 13 is white glass nonwoven tissue sold by Lydall Manning Co. of Troy, N.Y. as MANNIGLAS® 1800 or MANNIGLAS® 1801E. The MANNIGLAS® 1800 nonwoven product has a specified density of 19.7-28.3 $lb/2880\ ft^2$ and a thickness of about 5.9 mils. The MANNIGLAS® 1801E nonwoven product has a specified density of 19.7-28.3 $lb/2880\ ft^2$ and a thickness of about 6.6 mils. Nonwoven materials are sheets of randomly oriented natural or synthetic fibers, such as polyolefins, polyamide (i.e., nylon), polyester or rayon, or glass sometimes secured together by a binder, typically based on a polymeric material, such as an acrylic resin, a vinyl-acrylic resin, or the like. In some nonwovens, such as melt bonded polypropylene, the fibers are joined to each other by a melt bond, without additional resin.

In the insulation product embodiment of FIG. 1, the nonwoven layer 13 is secured to the randomly oriented inorganic fibers of the insulation mat by a binder agent, preferably a liquid or powderous thermosetting or thermoplastic binder agent, used in forming the mat 10, is sprayed on or mixed with the mat fibers. Liquid binder is usually applied before the fibers are collected on the forming belt. Powdered resin can be deposited before the mat forming section. The term "curing" or "cured" is used broadly to include various processes such as chemical reaction and or drying that cause the composition to set to a non-tacky solid and to permanently bond the components. "Heat cured" means cured using a thermal process, such as by the application of heat. Thermoplastic binder, on the other hand, simply harden after cooling to form an adhesive bond. The process for forming insulation product 100 is described below in connection with FIGS. 3A and 4.

In the insulation product 101 embodiment of FIG. 2, the nonwoven layer 13a is secured to the insulation mat at least in part by a melt bond between at least a part of nonwoven layer 13 and the fibers of the insulation mat 10. This melt bond may be in addition to or in lieu of a bond between the nonwoven layer 13 and the insulation mat 10 utilizing a heat cured binder agent as described above in connection with insulation product 100 of FIG. 1.

Figure 2A:
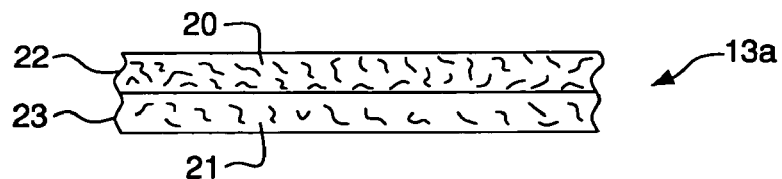
FIG. 2A is an enlarged, partial side view of the nonwoven layer of the insulation product of FIG. 2.

FIG. 2A is a partial side elevation view illustrating certain details of nonwoven layer 13a. In one embodiment, nonwoven layer 13a is a laminate structure including a first nonwoven layer 22 including first randomly oriented fibers 20. Nonwoven layer 13a also includes second layer 22, which is also preferably a nonwoven layer including second randomly oriented fibers 21. Fibers 20 are selected to have a melting point greater than that of fibers 21 such that fibers 20 do not melt while nonwoven layer 13a is bonded to the insulation mat 10, as described below in connection with the process of FIGS. 3B and 3C. In one embodiment, fibers 20 comprise glass fibers and fibers 21 comprise thermoplastic fibers such as polyester or polyolefin, such as polyethylene or polypropylene, or polyamide (i.e., nylon). Fibers 22 provide all or a portion of the melt bond between sheet 13a and the fibers of mat 10.

Figure 2B:
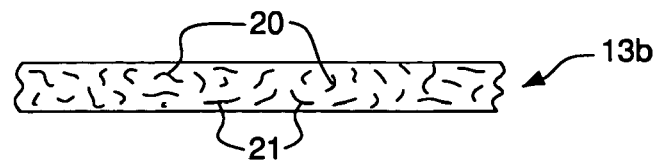
FIG. 2B is an enlarged, partial side view of an alternative nonwoven layer of the insulation product of FIG. 2.

In an alternative embodiment, nonwoven sheet 13b of FIG. 2B may be substituted for nonwoven layer 13a in the insulation product of FIG. 2. Nonwoven sheet 13b includes both first randomly oriented fibers 20 and second randomly oriented fibers 21 dispersed in a single layer. In one embodiment, fibers 21 are concentrated proximate to the bottom surface of nonwoven sheet 13b, i.e., that surface that contacts the mat 10. Alternatively, a woven fabric or film could be substituted for the sheets 13, 13a or 13b, so long as it can be bonded to the fibers of the batt and do not negatively interfere with the overall products characteristics and production machinery, e.g., steel belt conveyors.

As described above, in the insulation product 101 of FIG. 2, layer 13a or 13b is secured to the insulation mat 10 at least in part by a melt bond between at least a portion of the layer 13a or 13b and the fibers of insulation mat 10. When nonwoven layer 13a is used, layer 23, which includes second fibers 21, melts or at least partially melts during application of layer 13a to the mat 10. Sheet 13a is secured to the mat 10 when layer 23 cools. When nonwoven layer 13b is used, at least some of second fibers 21 melt during application of layer 13b to the mat 10. Layer 13b is secured to the mat 10 when fibers 21 cool.

Methods of manufacturing the insulation products 100, 101 are described below in connection with FIGS. 3A, 3B, 3C and 4. In some embodiments, the nonwoven layer 13, 13a or 13b is secured to at least the first major surface 11 as part of a continuous process that forms the insulation mat 10 or bats. A separate adhesive such as a hot melt adhesive is preferably not required to secure the nonwoven layer to the mat 10. This can be a factor in enabling the mat or batts of the present invention to achieve a "nonflammable" rating, or ASTM E-84 flame spread rating of 25 or less (See WO94/29540, p. 3) as described in the Background of the Invention section and in more detail below. The nonwoven layer 13 is at least applied to the first major surface 11, but may also be applied in some embodiments to the second major surface 12, side surfaces 14 or 15, the cut ends, or any combination of these surfaces.

A first process for producing the batt insulation product 100 of FIG. 1 is shown schematically in the combination of FIGS. 3A and 4. As is conventional, a plurality of fiberizers 200a, 200b, 200c produce fibers that are sprayed with a heat curable binder and collected on a conveyor 202. The fibers accumulate on the conveyor 202, gradually increasing the thickness of the mat (illustrated by stages 111a, 111b and 111c) formed on the conveyor 202. A nonwoven sheet 13 is provided from a source, such as roll 206, to compression conveyor 210 within curing oven 204 to contact the nonwoven sheet to uncured mat 111c. If desired, additional (when compared to the conventional process) heat curable binder agent may be provided from the spray (not shown) that coats the fibers from fiberizer 200c and/or from an alternative source of binder agent, such as reservoir 208, which includes a roll applicator therein. Adding additional heat curable binder serves to ensure that there is a higher concentration of binder proximate to first major surface 11 of the mat sufficient to bond the nonwoven layer 13 to the fibers of the mat 10. The resultant structure, including the uncured mat 111c and the nonwoven layer 13, are conveyed through the curing oven 204 to cure the binder, thereby forming cured low density insulation mat 111 with nonwoven layer 13 bonded thereto.

In forming low density fiber glass insulation, curing oven 204 typically heats the uncured mat to a temperature between about 300-600° F., and preferably between about 400°-560° F., and more preferably between about 450-525° F., for a period typically between about 199 to 20 seconds (30-300 feet per minute (fpm)), and preferably between about 150-24 seconds (40-250 fpm), and more preferably between about 120-30 seconds (50-200 fpm) for a 100 foot long oven while the uncured mat is held and conveyed by a series of compression conveyors within the curing oven. Line speeds can be as high 100 m/min (300 ft/min) or higher. For this reason, nonwoven layer 13 preferably is preferably a sheet of randomly oriented glass fibers, which has a melting temperature above the temperatures within the curing oven 204, but may also include synthetic fibers, such as nylon and polyester. Because the nonwoven layer 13 includes fibers with higher melting points, the layer 13 remains intact and is bonded to the fibers of the mat 111 as the heat curable binder agent cures.

With respect to FIG. 4, a continuous glass fiber blanket or mat 111 formed in accordance with the process of FIG. 3A is presented by a feed conveyer 104 to a heated roll 102, to which is simultaneously supplied a continuous web of bitumen-coated Kraft paper web 31, fed between the heated roll 102 and the cured glass fiber mat 111. The web of Kraft paper fed via roller 102 of FIG. 4 after being bitumen-coated is supplied from a roll 108 on payout stand 118, through an accumulator 138 for tensioning the Kraft paper web 31. In addition, the outside surface of the web can be marked at a marking station 114 with identifying information such as the R-value of the glass fiber mat and the production lot code before the Kraft paper web 31 is applied to the bottom of the glass fiber mat 111. Optionally, the edges of the Kraft paper web 31 are folded over to form the side tabs 18, 19 (FIG. 1 or 2) just prior to the web contacting the heated roll 102. The Kraft paper web 31 is oriented so that the bitumen-coated side of the Kraft paper web 31 faces the bottom of the glass fiber mat 111. The temperature is preferably selected to provide enough heat to soften the bituminous coating such that the bitumen-coated Kraft paper web 31 adheres to the underside of the glass fiber mat 111. The faced glass fiber mat 113 is transported away from the heated roll 102 by a tractor section 106, and delivered to a chopper 112, which periodically chops the faced glass fiber mat 113 to form a mat 100 of appropriate length, e.g., 48-105" for insulation batts and 32-100' for insulation rolls. The insulation products 100 so formed are then transported to packaging equipment (not shown). Prior to facing the mat 11 with facing layer 31, the mat 111 may also be provided to a slicer 125 to slice the mat 111 to sections or strips having desired widths, e.g., 15". In this embodiment, lower facing layer 31 is provided from separate rolls 108 spaced to provide a facing layer 31 of appropriate width to each sliced section of mat 111.

The method of applying a nonwoven layer to an uncured mat shown in FIG. 3A was tested. A glass nonwoven layer 13 was adhered to a fiberglass insulation mat 111c with additional fiberglass insulation resin binder applied to the nonwoven layer 13 prior to curing oven 204. A tab-less Kraft paper was adhered to the second major surface of the mat 111 (FIG. 4) with asphalt to act as a vapor barrier. The cured and faced product was then cut. It was observed that the product exhibited improved cutability, with the nonwoven glass layer providing an improved cutting surface for compressing the mat during cutting. It was also observed that the nonwoven facing layer adhered to the insulation mat better than other encapsulated layers affixed to an already cured fiberglass mat with a hot melt adhesive. It is believed that this improved bond is attributable to affixing the nonwoven as part of the curing process where the nonwoven makes multiple bonds to the insulating fiberglass as opposed to localized point adhesive contacts to an already cured mat.

Referring to FIG. 3B, a portion of the process for producing the batt insulation product 101 of FIG. 2 is shown. The same references are used to illustrate features in common with the process of FIG. 3A. The process of FIG. 3B is identical to the process of FIG. 3A, only laminate nonwoven layer 13a is applied to the uncured mat 111c. In the process of FIG. 3B, additional binder agent (described above) may not be necessary because of the melt bond that is formed between the layer 23, including the second fibers 21 described above, and the glass fibers of the mat 10. Nonwoven layer 22, including first fibers 20, is provided from roll 205. Nonwoven layer 23, including second fibers 21, is provided from roll 207. Alternatively, a single roll including pre-laminated sheet 13a may be used. The structure, including sheet 13a and uncured matt 111c, is then provided to the curing oven 204. Within the curing oven 204, the binder agent cures the mat 111 and possibly at least partially bonds mat 111 to nonwoven sheet 13a. In addition, at least a portion of layer 23, which includes fibers having a melting point at or below the curing oven temperature typically employed in the oven 204, melts. After the structure exits the curing oven 204, the melted layer 23 cools to form a melt bond with the fibers of the mat 111 and with the non-woven layer 22. Utilizing layer 22, which includes fibers 20 that have a higher melting temperature (e.g., glass fibers), maintains the integrity of the layer 13a during the process as well as prevents the layer 23 from sticking to the steel conveyor belt sections (not shown) that guide the structure through the curing oven 204. The resultant cured mat 111 with nonwoven layer 13a is then preferably provided to the process of FIG. 4 described above.

In an alternative embodiment of the process of FIG. 3B, rolls 207 and 205 can be replaced by a single source of sheet 13b, thereby providing a process that looks like the process of FIG. 3A only with sheet 13b at source 206. When the structure, including uncured mat 111c and nonwoven layer 13b, is conveyed through the curing oven 204, at least a first portion of nonwoven layer 13b (i.e., the portion(s) including second fibers 21) melts, while a second portion (i.e., the portions including first fibers 20) remains intact. After the structure exits the curing oven 204, the melted portions cool to form a melt bond with the glass fibers of the mat 111 and with the unmelted portions of sheet 13b. Utilizing a layer that includes fibers that have a higher melting temperature than used in the curing oven 204 (e.g., glass fibers) maintains the integrity of the layer 13b as well as prevents the layer 13b from sticking to the steel conveyor belt sections (not shown) that guide the structure through the curing oven 204. The resultant cured mat 111 with nonwoven layer 13b is then preferably provided to the process of FIG. 4 described above.

Figure 3C:
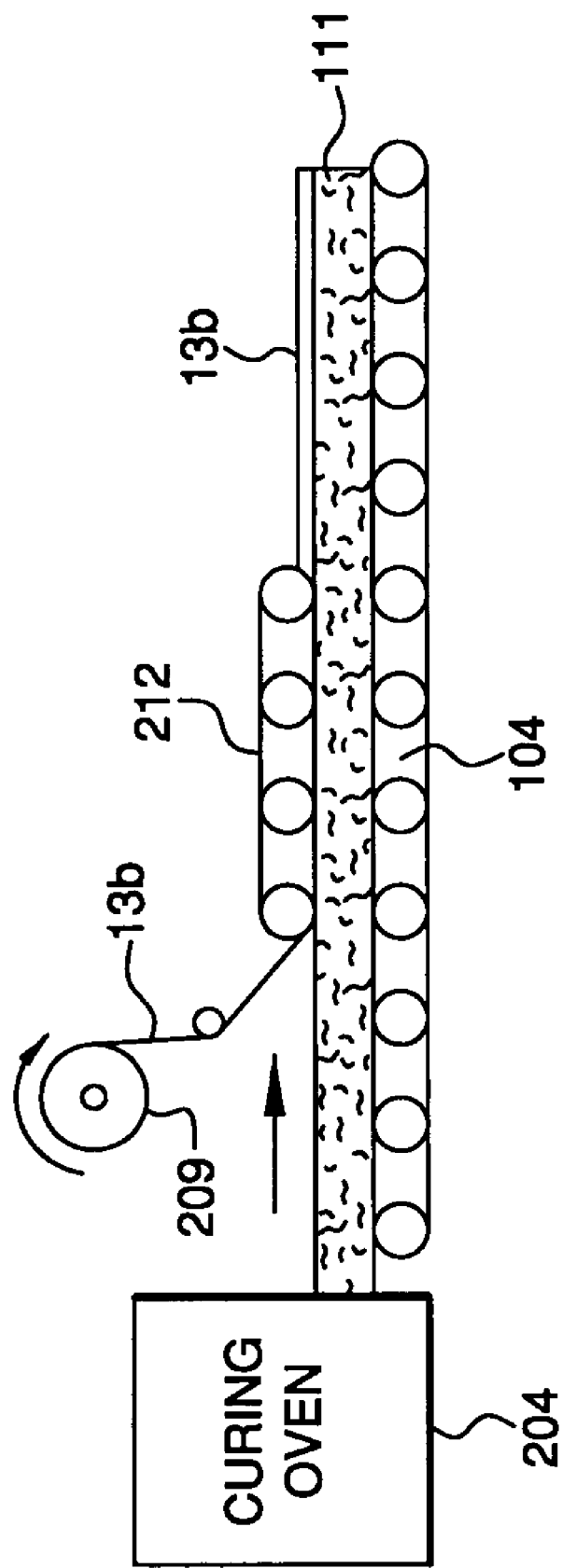
FIG. 3C is a schematic side elevation view of an alternative process for producing the insulation product of FIG. 2.

FIG. 3C illustrates another embodiment the process of forming the insulation product 101 of FIG. 2, in conjunction with the process of FIG. 4. After the curing oven stage 204, but while the mat 111 retains heat and is still at an elevated temperature, nonwoven layer 13b is provided from a roll 209 and applied to the first major surface of mat 111 via tractor section 212, which applies pressure and/or heat to, in essence, laminate the nonwoven sheet 13b to the fibers of the mat 111. As mentioned, this step is performed when the mat 111 is still at an elevated temperature that is above the melting point of the second fibers of nonwoven sheet 13b. Alternatively or in addition, tractor section 212 may supply the heat necessary to melt at least a portion of nonwoven sheet 13b. As described above in connection with FIG. 3B, if a nonwoven sheet 13a is applied instead of nonwoven sheet 13b, a dual source of the layers of a nonwoven sheet 13a (as shown in FIG. 3B) or a single source of a sheet 13a may substituted for roll 209 of sheet 13b.

Although not shown in FIG. 3A, 3B or 3C, nonwoven layer 13, 13a, or 13b may also be applied to second major surface 12 or even side surfaces 14 and 15 via appropriate placement of sources 206, 207 and 205 and 209, such as below the mat surface 12 and either before or after curing oven 204 in order to secure the nonwoven layer to surface 12. In this particular embodiment, the insulation product would not include a facing layer 31. Rather, a nonwoven layer would replace the facing layer 31, as shown in the embodiment 103 of FIG. 5.

Figure 5:
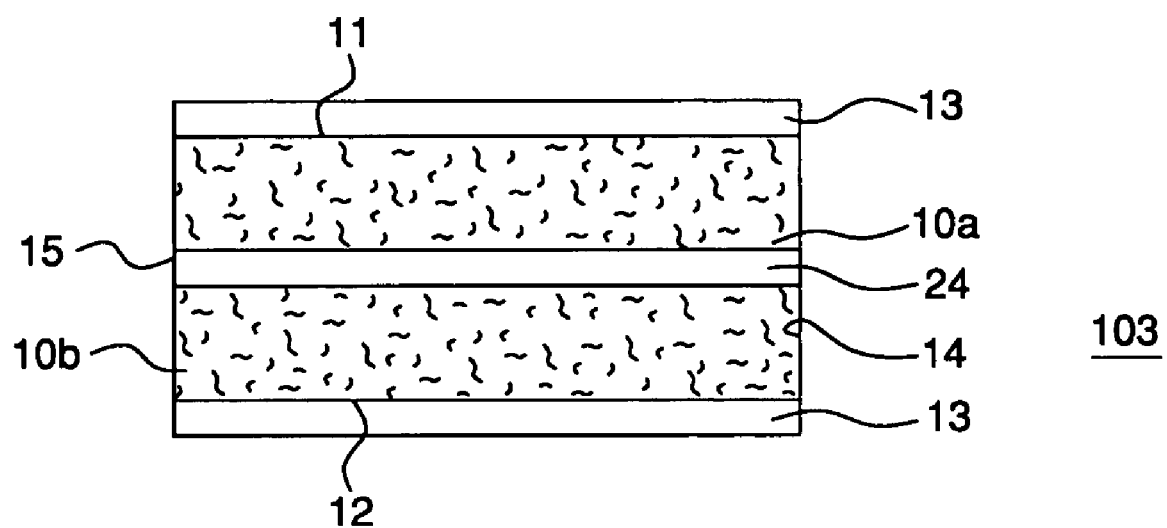
FIGS. 5-5D are side elevation views of an insulation product alternative of the present invention including one or more reinforcement layers.

FIG. 5 also shows an intermediate flexible reinforcement layer 24 between mat insulation layers 10a and 10b. In an exemplary embodiment, this layer 24 is also a nonwoven layer, preferably a glass nonwoven layer, provided within the insulation mat to reinforce the mat and to improve the mat's rigidity, thereby improving its cutability. The layer 24 may be added to the uncured insulation mat in the process of FIG. 3A or 3B described above by, for example, providing the layer 24 from a roll disposed between fiberizing units 200, which may be included in separate forming stages, such that the layer is introduced at the appropriate location before the mat 111c is introduced to the curing oven 204 for curing. For example, if four fiberizing units are used, the layer can be introduced between the second and third fiberizing units, with or without additional binder applied thereto. Alternatively, insulation mats may be formed via LPF (low pressure formation) processes, where binder treated fibers are deposited between two counter-rotating steel drums to compress the accumulated fibers into uncured mats for curing in an oven. Along with the fibers, a layer 24 may be introduced between or after the drums to form a part of the uncured, and eventually cured, mat. This process is described below in connection with FIG. 6.

Figure 6:
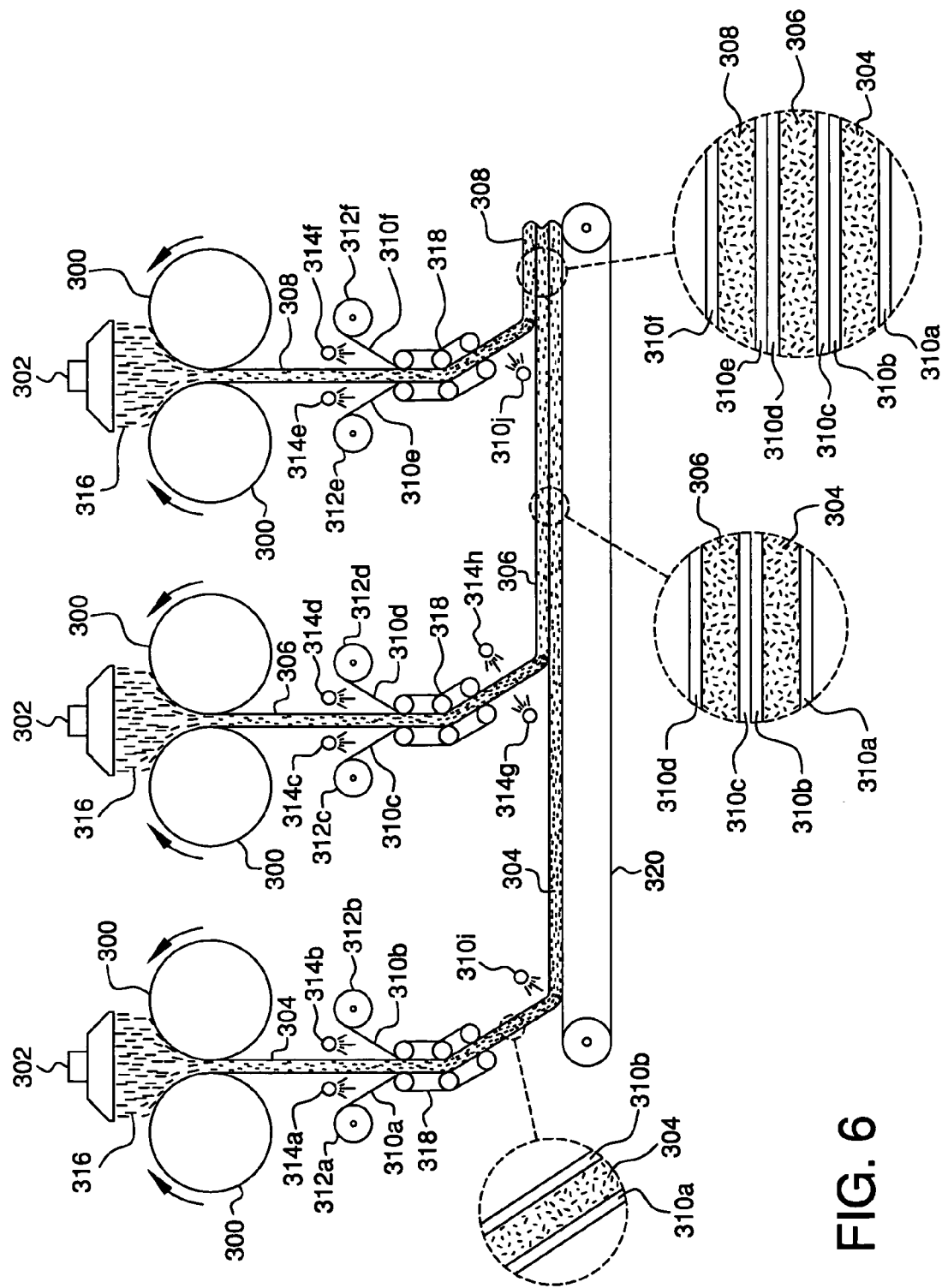
FIG. 6 is a schematic side elevation view of a process for producing the insulation products of FIGS. 5A-5D.

FIG. 6 illustrates a LPF process for forming insulation mats modified to introduce one or more reinforcing layers between the first and second major surfaces of the ultimate product. LPF processes are know and are described in, for example, U.S. Pat. No. 5,065,478, entitled "Process and Device for The Reception of Mineral Fibers" and U.S. Pat. No. 5,246,653, "Apparatus for The Continuous Production of Mineral Wool Nonwovens", the entirety of which are hereby incorporated by reference herein. Fiberizing units 302 provide a free jet bundle comprising a fiber/gas/air/binder mixture 316. This free jet bundle 316 is introduced into a box-shaped chute (not shown) to separate the fibers. The chute features at its bottom an accumulating conveyor operating as a type of filter, the accumulating conveyor being designed in the form of two adjacent counter-rotating drums 300. A part of the surfaces of the drums that receives the deposited fibers is subjected to a suction pressure that is generated by an extraction device within the drums 300. As a result of the suction pressure, the fibers are deposited onto the counter-rotating drum-shaped accumulating conveyors, thus forming a nonwoven insulation layer. The layers and then discharged downward between these drum-shaped accumulating conveyors to form nonwoven insulation layers 304, 306, 308. Between each pair of drums 300 is a gap width that corresponds in a certain relation, such as a ration, to the thickness of the produced nonwoven web.

Figure 5A:
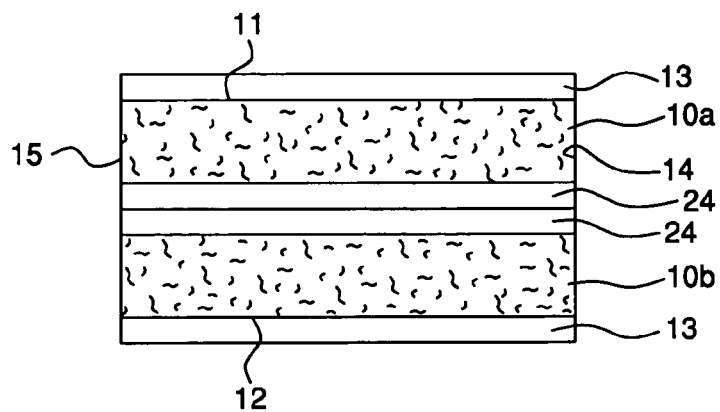

As shown, in one embodiment, three pairs of counter-rotating drums are used to form three insulation layers 304, 306, 308. Two sets of drums 300 may be utilized to form a final insulation product including two insulation layers, such as shown in FIGS. 5 and 5A. Four or more pairs of drums may be used as desired to form products having more than three insulation layers. The thickness of each insulation layer is controlled by the gap between the drums and may be adjusted as desired.

As shown in FIG. 6, the system includes a plurality of rolls 312a-312f that provide a plurality of layers 310a-310f, respectively. Rolls 312a and 312f preferably provide nonwoven layers 310a and 310f for facing the first and second major surfaces of the ultimate insulation product. As described above, these facing layers preferably include a nonwoven layer including glass fibers or other fibers that can withstand the heat of the curing oven. Alternatively, the layers 310a and 310f include a composite or laminate layer including fibers with a high melting temperature (i.e., above the temperature of the curing oven) and fibers of a lower melting temperature (i.e., below the temperature of the curing oven) that form a meltbond with the adjacent insulation layers as described above in connection with FIGS. 2 and 2A.

Rolls 312b to 312e provide reinforcing layers 310b to 310e between insulation layers 304, 306 and 308. In one embodiment, each reinforcing layer comprises a nonwoven layer including fibers with a melting temperature above the curing temperature of the curing oven. The reinforcing layer preferably includes a nonwoven layer comprising glass fibers, as described above. In an alternative embodiment, the reinforcing layers may include nylon, polyester, polyethylene, or other high temperature polyolefin with a melting temperature above the temperature used in the curing process. As shown in FIG. 6 and the insulation product of FIG. 5B, each insulation layer 304, 306, 308 may have a nonwoven glass layer on its respective major surfaces. Alternatively, as shown in FIG. 5C, only one reinforcing layer may be disposed between each pair of adjacent insulation layers. Using the system of FIG. 6, the embodiment of FIG. 5B may be produced by eliminating either layer 310b or layer 310c and either layer 310d or layer 310e.

As shown in FIG. 6, in one embodiment, three separate insulation layers 304, 306, 308 are formed in a LPF process. The insulation layers are deposited and stacked on conveyor 320 via tractor sections 318 along with nonwoven facings 310a and 310f and reinforcing layers 310b to 310e. This stack, comprising a plurality of insulation layers, reinforcing layers and facing layers, is then conveyed to a curing oven (not shown) for heating of the stack to cure the binder. The binder that is sprayed or otherwise introduced into the insulation layers during formation of layers 304, 306, 308 can serve to bond respective layers 310 to the insulation layers 304, 306,308. In one embodiment, additional binder sources 314a-314j are used to selectively provide additional binder or other adhesive directly to layers 310a-310f for adhering the layers to the insulation layers 304, 306, 308 and/or to adjacent nonwoven layers 310, such as adhering layer 310b to layer 310c and layer 312d to layer 312e. Binder sources 314a and 314f provide binder directly to nonwoven layers 310a and 310f, respectively, for facilitating adherence of these layers to the major surfaces of insulation layers 304 and 308 (i.e., to the major surfaces 11, 12 of the insulation products 103-103d). Binder sources 314b, 314c, 314d, and 314e may be included to provide additional binder to layers 310b, 310c, 310d and 310e to improve adherence of the nonwoven layer to the insulation layers.

Figure 5B:
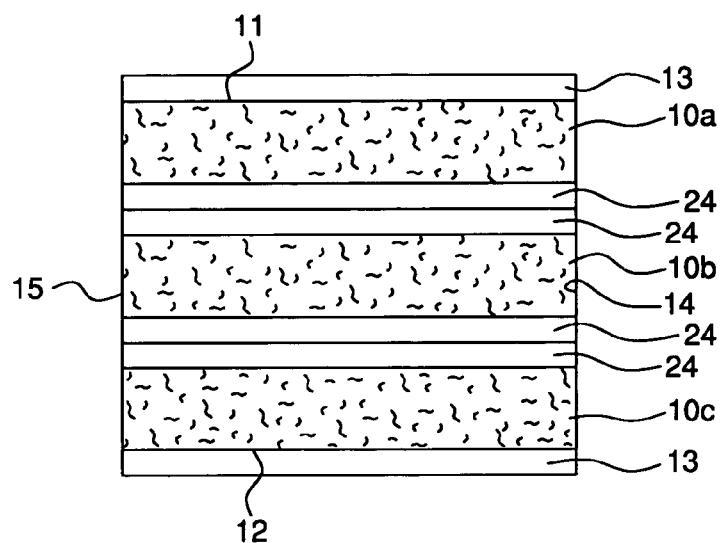
Figure 5C:
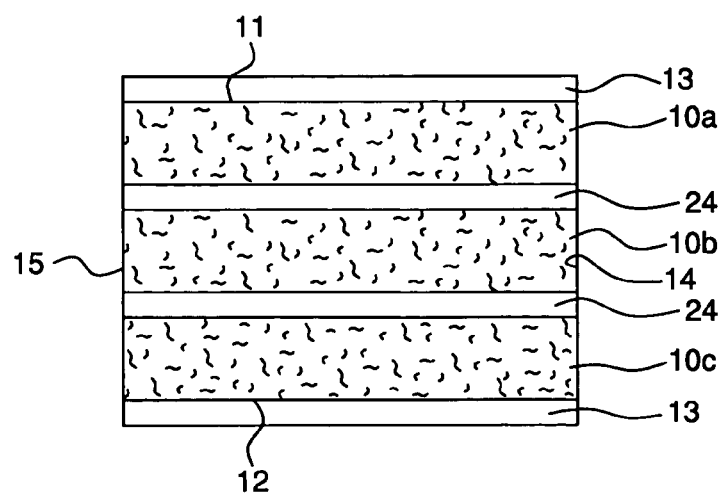
Figure 5D:
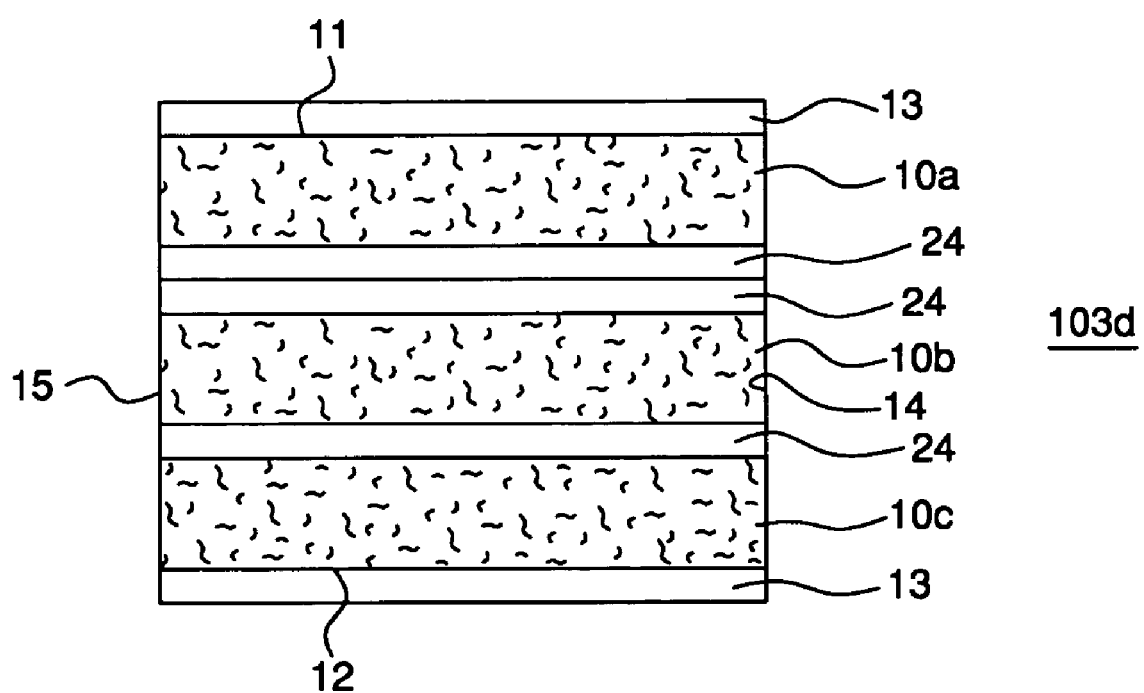

Referring now to the various embodiments shown in FIGS. 5-5D, which may be manufactured using a LPF system as shown in FIG. 6, and specifically to FIG. 5B, FIG. 5B is a side elevation view of an insulation product 103b including three insulation layers 10a, 10b and 10c, two nonwoven facing layers 13 and four reinforcing layers 24. In one embodiment, each insulation layer 10a, 10b and 10c has a thickness of about 3.5" and has an insulated effectiveness rating of about R-13. Insulation product 103b essentially comprises three separately stacked and faced insulation products, i.e., a first insulation product comprising a first nonwoven layer 13, insulation layer 10c, and a first reinforcing layer 24; a second insulation product comprising a second reinforcing layer 24, insulation layer 10b and a third nonwoven layer 24; and a third insulation product comprising a fourth reinforcing layer 24, insulation layer 10a and a second nonwoven layer 13. In this embodiment, adjacent pairs of reinforcing layers 24 are only loosely coupled together, such as with binder that bleeds through the nonwoven reinforcing layers 24 from the adjacent insulation layers or from sprays 314b-314e and/or with a light application of binder or other adhesive from sources 314g and 314h, such that the insulation products may be separated, preferably by hand, along the interfaces between adjacent, contacting reinforcing layers 24. In this manner, three insulation products, each having an insulated effectiveness rating of R-13 are manufactured together. The product 103b can be packaged with all three insulation layers intact for later field separation and use, or the product 103b can be separated into its component insulation products, which are then packaged separately or together.

In an alternative embodiment of an insulation product 103c shown in FIG. 5C, only one reinforcing layer 24 is disposed between each insulation layer 10a, 10b and insulation layers 10b, 10c. In this embodiment, the thicknesses and respective R-values of each insulation layer are selected so that the insulation product 103c, comprising all three insulation layers, has a desired thickness and R-value. As noted above, two reinforcing layers, such as two of reinforcing layers 310b-310e, are eliminated in this embodiment. In one embodiment, layers 310c and 310e are eliminated from the system of FIG. 6 and binder sources 310i and 310h apply additional binder for facilitating a strong adhesive bond between layer 310b and insulation layer 306 and between layer 310d and insulation layer 308, respectively. In another embodiment, layers 310b and 310e are eliminated, and binder sources 314g and 314h apply additional binder to layers 310c and 310d, respectively, for facilitating a strong adhesive bond between insulation layer 304 and reinforcing layer 310c and between insulation layer 308 and reinforcing layer 310d. When insulation product 103c is used as a final product including all three insulation layers 10a, 10b, 10c, reinforcing layers 24 provide structural support for the final product and facilitate cutting of the product into selected widths and/or lengths by providing an improved rigidity.

It should be apparent from the foregoing, that different combinations of binder sources 314 and reinforcing layers 310 may be utilized to provide the insulation products 103b and 103c, as well as different combinations of insulation layers 10, i.e., insulation layers 10 can be any combination of thicknesses and R-values (and do not necessarily have to have the same thickness and R-value) as desired. Further, FIG. 5D illustrates insulation product 103d, which includes three insulation layers 10a, 10b, 10c, two nonwoven facing layers 13, and three reinforcing layers (rather than four or two reinforcing layers as shown in FIGS. 5B and 5C, respectively) 24. In this embodiment, insulation product 103d provides two insulation products when the insulation product 103d is separated along adjacent reinforcing layers 24, i.e., a first insulation product including a first nonwoven layer 13, insulation layer 10c, first reinforcing layer 24, insulation layer 10b, and second reinforcing layer 24; and, a second insulation product comprising third reinforcing layer 24, insulation layer 10a and second nonwoven layer 13.

FIGS. 5 and 5A illustrate embodiments of insulation products including two insulation layers 10a and 10b. Insulation products 103 and 103a may be manufactured using the system of FIG. 6 as described above, only utilizing two pairs of forming drums 300 to provide two insulation layers, e.g., insulation layers 304 and 308 (or other combination). As shown in FIG. 5B, insulation product 103b includes two reinforcing layers 24 disposed between the major surfaces 11 and 12 of the insulation product and separating insulation layers 10a and 10b. In one embodiment, like insulation product 103b, reinforcing layers 24 of insulation product 103a are only lightly adhered to one another to facilitate field separation or separation prior to packaging. In one embodiment, each insulation layer 10a and 10b has a thickness of about six inches and a insulated effectiveness rating of about R-19. Therefore, the insulation product 103a, including both insulating layers 10a and 10b, has a combined rating of R-38. The R-38 insulation product 103a can then be separated at the interface between adjacent reinforcing layers 24 into two faced products each having a rating of R-19, rather than manufacturing an R-38 product without any intermediate nonwoven layers and sawing through the center of the R-38 product to form two R-19 products, as is conventional. When compared to the sawing method, insulation product 103b may provide two R-19 insulation products with better fiber density distribution therebetween.

The insulation product 103 of FIG. 5, like insulation product 103c of FIG. 5C, includes only one reinforcing layer 24 disposed between insulation layers 10a and 10b. As described above, the respective thickness and insulated effectiveness rating of the insulation layers 10a and 10b can be selected to provide the desired thickness and insulated effectiveness rating for insulation product 103 when used as a final insulation product for installation. In this embodiment, reinforcing layer 24 provides structural support for the insulation product and for facilitating cutting of the insulation product across its width or along its length.

Although specific examples of insulation layers 304, 306 and 308 are provided above where the insulation layers have R-values of R-13 and R-19 and thicknesses of 3.5" and 6", respectively, the insulation layers are not so limited. In one embodiment, the R-value of each insulation layers is between about R-2 to R-38, and more preferably between about R-11 and R-21, and the thickness of each insulation layer is between about 1.0-14.0", and more preferably between about 2.0-6.5". It should also be understood that although the insulated effectiveness generally changes with the thickness of the product, it is also dependent on other factors and a 3.5" or 6" product may have, for example, an R-value of R-11, R-13, R-15, R-19, R-21 or other R-value. A given layer could be as small as nominally 1.0" in thickness to as high as 14.0" or more in thickness, and resulting R values could range from as small as R-2 to as high as R-38 for a given layer and density. Resulting combination products could, therefore, have R-values between about R-4 to about R-60, including (in addition to the other R-values listed) R-8, R-30, R-38, R-49 and other standard accepted thermal values.

Although not shown in FIGS. 5-6, the insulation product may include a vapor retardant facing layer, such as a non-extensible Kraft paper adhered to a major surface of the insulation product by bituminous asphalt layer 16, collectively bitumen coated Kraft paper 31, as shown, for example, in FIGS. 1, 2 and 4.

From the foregoing, specifically from the description of FIGS. 5-5D and FIG. 6, a reinforced and/or modular insulation product is provided along with a method of manufacturing the same. The insulation product includes at least one reinforcing layer. In one embodiment, the reinforcing layer can provide added rigidity to the insulation product, thereby facilitating cutting thereof, without increasing binder content (at least significantly) within the insulation layers. Alternatively, the reinforcing layer can serve as a nonwoven facing layer after separation of an insulation layer at the reinforcing layer from a stack of insulation layers. The manufacturing method is easily adapted to provide reinforced insulation products having desired R-values and thicknesses. Further, the manufacturing method is easily adapted to provide insulation products that can be separated into one or more sub-products having any combination of number of insulation layers, insulation layer thicknesses and R-values by employing different combinations of insulation layers in the stack and different combinations of reinforcing layers.

The reinforcing layer may also improve the resiliency, stiffness, tensile strength, rigidity, durability and/or strength of the finished product, thereby facilitating the installation process and possibly reducing or eliminating the need to use staples or hangers for support. The added strength of the product would be especially important in situations where the insulating material has to support its own weight or where the reinforcing material is used to help support fasteners used to stabilize the insulation. For example, a large roll of insulation (e.g., 36", 48" or 60" wide by 25', 50' or 75' long) that is draped down a wall, roof or floor of a structure may need to support its own weight and may possibly require some fasteners to attach the material to the wall, roof or floor. Without some type of reinforcing material, the insulation product would have a tendency to tear apart.

It is also contemplated that the nonwoven layer, for example layers 13 and/or 24, may extend beyond one or more of the lateral edges of the product to form fastening tabs, such as nailing or stapling tabs. The portion of the nonwoven layers extending beyond lateral edges of the product may be sufficient to allow folding thereof to provide stronger tabs. These embodiments merely require that the nonwoven layer 13, 24 have a width greater than the width of the product.

In one embodiment, the nonwoven layer 13, 13a, or 13b described above is provided to at least one surface of the mat 10 with enough transparency or translucency to determine the color of the mat underneath. Of course, the nonwoven layer 13, 13a, 13b may also be opaque. The nonwoven layer 13, 13a or 13b may also include a color additive.

In preferred embodiments, the nonwoven layer 13, 13a, 13b is a highly porous membrane, which enables quick air escape from the batt under conditions of rapid compression, such as during packaging. In one embodiment, the vapor retarder facing material layer 17 and/or nonwoven materials described above may also be less than or equal to one mil in thickness, preferably less than about 0.6 mil in thickness, and most preferably less that 0.4 mil in thickness, so that the final insulation batt readily meets the ASTM E-84 test for flame spread. The mass of these layers in this embodiment must be sufficiently low to obtain a flame spread rating of about 25 or less in the absence of fire retardants. For the purposes of this disclosure, the term "the absence of fire retardants" means that the material either actually contains no fire retardants, or contains fire retardants in such an insubstantial amount that the facing, in the adhered condition, would still obtain a flame spread rating of 25 or less if the fire retardant were left out of the product. In addition, the nonwoven layers of this invention desirably is slippery to enable the batt to be pushed or slid into place on top of existing attic insulation, for example. Preferably, the coefficient of kinetic friction of the surface of the nonwoven layer is less than 1.0, when the nonwoven layer surface is pulled or dragged across the surface of an unfaced glass fiber batt having a density of about 7-12 kg/m$^3$ (about 0.4 to 8 lb/ft$^3$).

Still further, the nonwoven layer, particularly when comprising glass fibers, provides an excellent surface for field cutting of the insulation product. Low density insulation mats with polyester or nylon facing layers have proved difficult to field cut. In addition, these polyester and nylon facing layers cannot withstand the heat of the curing oven and must be adhered to the already cured mat by a separate post-curing process using an adhesive. With the recent proliferation of building supply superstores and upsurge in "do-it-yourself" mind-set, many individuals have elected to install insulation themselves, rather than rely on professionals. The improved cutting surface eliminates the need for costly one-time purchases of specialized cutting tools. Further, glass nonwoven layers are less expensive than synthetic films, thereby providing a more cost conscious consumer (and professional) product.

Although various embodiments have been illustrated, this is for the purpose of describing and not limiting the invention. Various modifications, which will become apparent to one of skill in the art, are within the scope of this invention described in the attached claims.

What is claimed is:

1. A batt insulation product comprising:
   first and second insulation layers coupled together to form a batt, each insulation layer containing randomly oriented fibers bonded together by a binder, each insulation layer having first and second major surfaces and a pair of side portions; and
   at least one prefabricated flexible reinforcing non-woven layer comprising randomly oriented glass fibers disposed between said insulation layers and extending along a length of said batt, said at least one reinforcing layer being directly bonded to a respective major surface of each of said insulation layers and forming a bond located in between the respective major surfaces of said insulation layers along said respective major surfaces, wherein the thickness of each of said insulation layers is substantially greater than the thickness of said reinforcing layer,
   wherein said batt comprises a plurality of said flexible reinforcing non-woven layers disposed between said first and second insulation layers and extending along the length of said batt,
   wherein said plurality of reinforcing non-woven layers comprises at least two reinforcing layers disposed substantially parallel to said major surfaces and each other, and
   wherein said at least two reinforcing non-woven layers comprises at least two reinforcing layers disposed substantially parallel to said major surfaces and each other, and
   wherein said at least two reinforcing non-woven layers are coupled together along respective faces in between the insulation layers, whereby said insulation product is separable at an interface of said at least two reinforcing non-woven layers to form at least two insulation products.

2. The insulation product of claim 1, wherein said insulation batt comprises three stacked insulation layers each separated by at least one prefabricated flexible reinforcing non-woven layer comprising glass fibers.

3. The insulation product of claim 2, wherein each of said insulation layers has an insulated effectiveness (R-value) between about R-2 to R-38.

4. The insulation product of claim 1, wherein said batt is heated to cure said binder at a temperature between about 300-6000° F.; and
   wherein said glass fibers have a melting temperature above about said curing temperature, said reinforcing non-woven layer being bonded to said insulation layers at least in part by said binder.

5. The insulation product of claim 1, further comprising a vapor retarder facing layer disposed on at least one of said major surfaces.

6. The insulation product of claim 5, wherein said vapor retarder facing layer comprises a Kraft paper coated with a bituminous material or a polymeric facing coated with an adhesive.

7. The insulation product of claim 1, wherein said batt has first and second major surfaces, said insulation product further comprising:
   at least one nonwoven facing comprising randomly oriented glass fibers adhered to at least one of said first and second major surfaces of said batt.

8. The insulation product of claim 7, further comprising a vapor retarder facing layer disposed on at least one of said major surfaces of said batt.

9. The insulation product of claim 8, wherein said vapor retarder facing layer comprises a Kraft paper coated with a bituminous material or a polymeric facing coated with an adhesive.

10. The insulation product of claim 7, wherein said batt has a density of less than about 2.0 pounds per cubic foot.

11. The insulation production of claim 1, wherein said plurality of reinforcing layers is bonded to said insulation layers at least in part with said binder.

12. A batt insulation product comprising:
    first and second low density insulation layers coupled together to form a batt, each insulation layer containing randomly oriented glass fibers bonded together with a binder, each insulation layer having first and second major surfaces and a pair of side portions; and a plurality of prefabricated flexible reinforcing non-woven tissue layers comprising bonded glass fibers disposed between said insulation layers and extending along a length of said batt, said plurality of tissue layers having a first face bonded to a major surface of said first insulation layer at least in part with said binder and a second face bonded to a major surface of said second insulation layer at least in part with said binder, whereby said insulation layers are bonded together along said major surfaces, wherein the thickness of said insulation layers is substantially thicker than the thickness of said tissue layer, wherein each of said tissue layers has a tensile strength along said length greater than the tensile strengths of said insulation layers, and wherein said plurality of tissue layers are directly coupled together in between said insulation layers along opposing faces at least in part with said binder, whereby said insulation product is separable at an interface of said reinforcing layers to form at least two insulation products.

13. The insulation product of claim 12, wherein the thickness of each of said insulation layers is between about 1.0-14.0 inches and the thickness of said tissue layer is less than about 10 mils.

14. A batt insulation product comprising:

first and second low density insulation layers coupled together to form a batt, each insulation layer containing randomly oriented glass fibers bonded together with a binder, each insulation layer having first and second major surfaces and a pair of side portions; and a plurality of prefabricated flexible reinforcing non-woven tissue layers comprising bonded glass fibers disposed between said insulation layers and extending along a length of said batt, said plurality of tissue layers being bonded to major surfaces of both of said insulation layers by said binder, whereby said insulation layers are bonded together along said major surfaces, 15. An insulation product comprising:

first and second insulation layers coupled together to form a batt, each insulation layer containing randomly oriented fibers bonded together by a binder, each insulation layer having first and second major surfaces and a pair of side portions; and a plurality of flexible reinforcing glass nonwoven layers disposed between said first and second insulation layers and extending along a length of said batt, said reinforcing layers disposed substantially parallel to said major surfaces and each other, wherein said at least two reinforcing layers are directly coupled together in between said insulation layers along respective faces, whereby said insulation product is separable at an interface of said reinforcing layers to form at least two insulation products.

16. The insulation product of claim 15, wherein said insulation product is separable by hand.

17. The insulation product of claim 15, wherein each of said flexible reinforcing layers has a thickness between about 0.0059-0.0066 inches.

18. The insulation product of claim 15, wherein said flexible reinforcing layers are bonded to said insulation layers at least in part with said binder.

19. The insulation product of claim 18, wherein said flexible reinforcing layers are bonded together between said insulation layers by said binder, said bond between said reinforcing layers being weaker than a bond between said flexible reinforcing glass layers and said insulation layers.

20. The insulation product of claim 18, wherein said flexible reinforcing layers are bonded together at said interface by said binder.

* * * * *

UNITED STATES PATENT AND TRADEMARK OFFICE
CERTIFICATE OF CORRECTION

| | | |
|---|---|---|
| PATENT NO. | : 7,252,868 B2 | |
| APPLICATION NO. | : 10/806810 | |
| DATED | : August 7, 2007 | |
| INVENTOR(S) | : David I. Suda and Michael J. Lembo | |

It is certified that error appears in the above-identified patent and that said Letters Patent is hereby corrected as shown below:

Claim 1, Column 14, line 16, delete "wherein said at least two reinforcing non-woven layers comprises at least two reinforcing layers disposed substantially parallel to said major surfaces and each other, and";

Claim 4, Column 14, line 35, delete "6000" and insert therefor --600--;

Claim 11, Column 14, line 62, delete "ion" after product; and

Claim 14, Column 16, line 3, after the word surfaces, insert --wherein the thickness of said insulation layers is substantially thicker than the thickness of said tissue layer, and wherein said plurality of reinforcing layers are directly coupled together in between said insulation layers along opposing faces by said binder, whereby said insulation product is separable at an interface of said reinforcing layers to form at least two insulation products.--

Signed and Sealed this

Second Day of December, 2008

JON W. DUDAS
*Director of the United States Patent and Trademark Office*